US005386885A

United States Patent [19]

Bunzl et al.

[11] Patent Number: 5,386,885

[45] Date of Patent: Feb. 7, 1995

[54] ELECTRO-MECHANICAL PIVOT WING DRIVE FOR PIVOTING WINGS OF DOORS OR THE LIKE

[75] Inventors: Helmut H. Bunzl, Fehraltorf; Hansrudolf Bisang, Regensdorg; Hans Minder; Daniel Burgi, both of Fehraltorf, all of Switzerland

[73] Assignee: Record Turautomation GmbH, Wuppertal, Germany

[21] Appl. No.: 84,262

[22] PCT Filed: Jan. 4, 1992

[86] PCT No.: PCT/EP92/00013

§ 371 Date: Sep. 8, 1993

§ 102(e) Date: Sep. 8, 1993

[87] PCT Pub. No.: WO92/12318

PCT Pub. Date: Jul. 23, 1992

[30] Foreign Application Priority Data

Jan. 8, 1991 [DE] Germany ............................ 4100335

[51] Int. Cl.[6] ......................... F03G 1/08; E05F 15/12

[52] U.S. Cl. .................................... 185/40 R; 16/49; 16/64; 49/334; 49/340; 74/89.13

[58] Field of Search ..................... 74/89.13; 16/49, 64; 49/334, 340; 185/40 R; 318/376, 760

[56] References Cited

U.S. PATENT DOCUMENTS

| | | | |
|---|---|---|---|
| 3,457,674 | 7/1969 | Catlett et al. | 49/340 |
| 4,045,914 | 9/1977 | Catlett | 49/334 |
| 4,333,270 | 6/1982 | Catlett | 49/336 |
| 4,429,264 | 1/1984 | Richmond | 49/340 X |
| 4,727,679 | 3/1988 | Kornbrekke et al. | 49/340 X |
| 4,973,894 | 11/1990 | Johansson | 49/334 X |
| 5,018,304 | 5/1991 | Longoria | 49/340 |

*Primary Examiner*—Allan D. Herrmann

*Attorney, Agent, or Firm*—Nixon & Vanderhye

[57] ABSTRACT

The electro-mechanical drive includes an electric motor, a transmission and a restoring spring. To improve the capacity to close the door, particularly in the event of a power failure, a large coil spring used as the restoring spring surrounds the electric motor and transmission. The electric motor is short circuited when not powered in order to create a generator effect with consequent damping during movement of the door.

19 Claims, 2 Drawing Sheets

FIG. 2
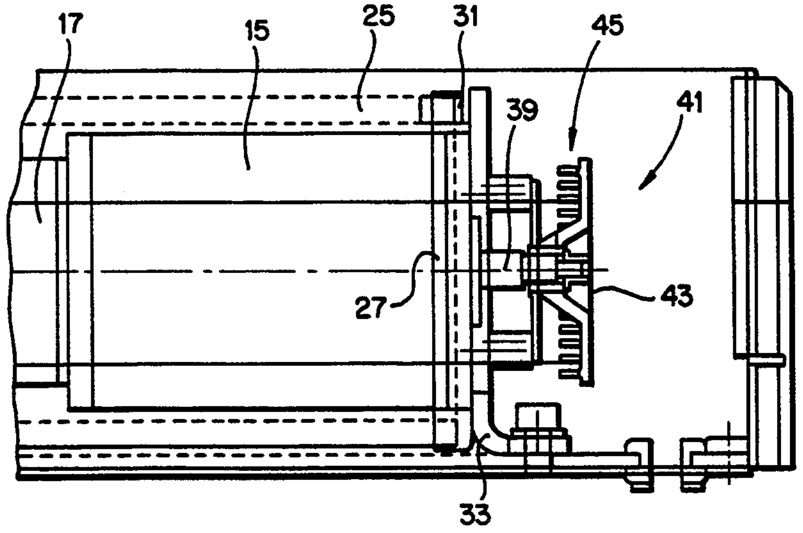
FIG. 3
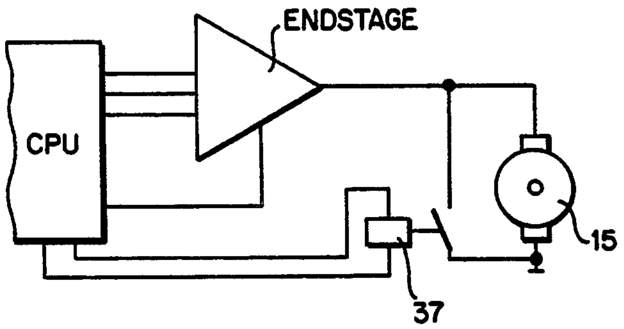
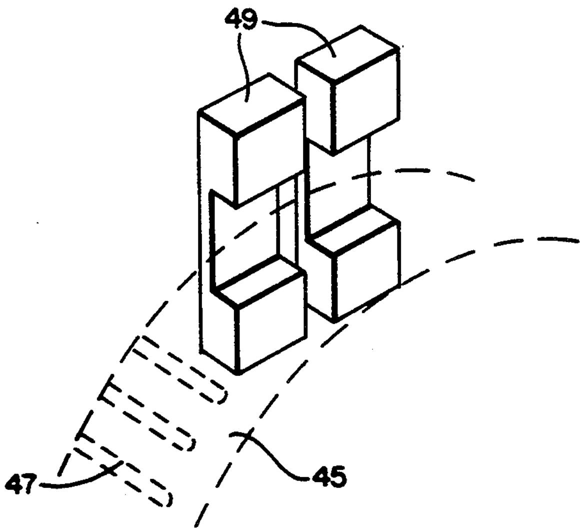
FIG. 4

ELECTRO-MECHANICAL PIVOT WING DRIVE FOR PIVOTING WINGS OF DOORS OR THE LIKE

BACKGROUND OF THE INVENTION

The invention relates to an electro-mechanical pivot wing drive for pivoting wings of doors or the like.

An electro-mechanical pivot wing drive for pivoting wings of doors or the like is known, for example, from German Patent Publication DE 32 02 930 C2 and comprises an electric motor with a planetary gear disposed in an axial direction in respect to the shaft of the electric motor, which is fixedly connected with the housing of the electric motor. This is followed by a bevel wheel gear drive with two oppositely located free ends of a power take-off shaft. Because of this it is possible to employ the entire component for controlling a left or a right door wing without further pole-reversal steps. For this purpose the entire arrangement is embodied in the housing symmetrically to the center longitudinal plane, the shaft of the electric motor or the longitudinal shaft of the planetary gear which is identical with it extend through the shaft of the power take-off shaft approximately in its center.

In case of a power failure it is intended to provide a restoring spring unit, preferably in the form of a helical spring, as a further safety measure, which is always seated on the end of the drive shaft opposite to a linkage of bars needed for opening and closing the wing and which is supported on the one side on the drive shaft and on the other at the housing.

Two cam disks, via which the electric voltage for the electric motor can be charged with a voltage which is opposite to the respective movement direction, are provided to make possible a certain amount of optimization during the closing and opening operations. By these means, braking of the door prior to attaining the extreme opened or closed position is obtained. Otherwise the electric motor can be charged with a high voltage for accelerating the wing out of its end position (closed or open position) in accordance with the polarity, and during pivoting of the wing into the other end position with a lesser voltage.

However, the known electro-mechanical drive has the disadvantage that on the one hand the planned helical spring would have to be made sufficiently strong to be able to perform the closing movement in an adequate amount of time. On the other hand, however, because of this the door is slammed shut suddenly at a high speed, which is not only surprising and completely unusual, but possibly even dangerous. It is particularly disadvantageous that the closing movement of the door during the closing operation itself is performed with a greatly changing force. The closing kinematics are therefore very varied compared with customary known hydraulic door closers which can close a door evenly to a great extent, as is known.

Finally, the entire motor control has disadvantages because in this case an adaptation to specific requirements is not possible.

British Patent Publication GB-A-2,206,926 also discloses a pivot wing drive having a large-dimensioned helical screw preferably disposed co-eccentrically to a rotor/stator arrangement. The one end of the helical spring is supported fixed on the housing, while the opposite end of the helical spring is connected with the power take-off shaft of the drive unit which is coupled with the pivot wing door. Opening of the door takes place against the force of this helical spring. It is intended by means of the known drive to recover in the closing phase the energy of the spring element, which exceeds the restoring force of the spring element required for the desired closing movement of the door, along with simultaneous braking of the closing movement of the door in the main phase of the closing movement. When the door is only slightly open, preferably less than 5°, the final closing of the door is accomplished by using the recovered energy in order to assure closing of the door. For this purpose the pivot wing drive is provided with a rotor, a stator and an energy storage device, wherein the electric motor is used and operates selectively as a generator or an electric motor, depending on the requirements. It can be seen from the specification and in particular from FIG. 1 of this pre-published document, that the moment of torque shown in FIG. 1 and acting on the door is more than six times stronger at the time of the maximal opening position of the door than at the start of the opening path of the door. However, this results in that particularly at the start of the closing movement the door is moved into the closed position, and that the closing movement of the door itself in the course of the closing operation is performed with greatly changing force. This not only requires different closing kinematics but also, in case of a power failure, opening kinematics which are completely different in respect to conventional hydraulic door closers, because the opening forces required during opening of the pivot wing change greatly over the entire opening range, i.e. increase enormously.

In a door opening mechanism known from US Patent Publication U.S. Pat. No. 3,237,932, the drive shaft of the electric motor also extends in the long direction of the housing. The gear transmission from the coupling output shaft to the shaft is accomplished comparatively elaborately by the use of an arrangement of a ball-spindle and a toothed rack. A restoring spring device is installed in the housing in the axial direction, lying laterally near the drive transmission members including the toothed rack and the other toothed wheels, namely being axially offset in the axial direction in respect to the electric motor. In this case the restoring spring is of a comparatively small size.

During closing of the door the generator is short-circuited for generating a magnetic counter-force for creating a braking effect to affect the closing speed of the door.

However, this embodiment also causes a large change in the opening forces required for opening a pivot wing door, i.e. they increase greatly.

SUMMARY OF THE PRESENT INVENTION

It is therefore the object of the present invention to provide, on the basis of the prior art of the species, an improved electro-mechanical pivot wing drive which makes possible a more comfortable opening and closing process. It is intended, in particular in case of a power failure, that the pivot wing drive has closing kinematics which are similar to the known hydraulic door closers.

A clear technical improvement is achieved by the present invention that closing kinematics comparable to the customary closing operation can be achieved by the present invention even in case of a power failure.

In accordance with the invention, a helical spring is provided for this which can be of an appropriately large size and which, in a preferred embodiment, is disposed around the electrical drive motor and the planetary gears connected to its front side and having the same center shaft. Thus in a preferred embodiment the helical spring surrounds the electric motor along with the drive unit, preferably in the form of a planetary gear, connected to its front side. Because of this there is no requirement for an enlarged space or for a larger housing box.

It is furthermore provided that in case of power failure the electric motor is short-circuited, because of which a generator effect is achieved.

It is assured by both measures on the one hand that the characteristic curve path of the spring device during the closing operation remains practically unchanged, i.e. is not subject to the large variations as in the prior art, and that in addition, by means of incorporating the short-circuited electric motor acting as a generator, a door wing, for example, is damped during currentless closing in such a way that the closing movement is performed similar to that of a hydraulic door closer.

This means that in spite of a forceful closing operation it takes place quiet and damped.

The helical spring preferably is of such size, i.e. it has a large enough diameter and a sufficient number of coils, that the increase of the spring moment during door opening, i.e. during the entire maximal displacement path, does not exceed a value of 50%, preferably even less than 40%, 30%, 25%, or even is only 20% or 10%.

The helical spring is preferably supported on a striker seated on the output shaft of the planetary gear and, on the rear side, on a support disk fixed on the housing. The support disk fixed on the housing can be pre-settable by appropriate means so that it becomes possible to set or change the initial stressing force of the helical spring.

In order to assure an improved and much more comfortable opening and closing operation at all, a four-quadrant control is used for the electric motor. This means that it is possible to set and control the electric motor in various ways pre-selectively in the opening as well as in the closing direction in respect to the desired torque as well as rpm.

For this purpose a position sensor is provided on the back of the electrical drive which, in a preferred embodiment, may consist of not only one, but two adjacently located photoelectric barrier. By means of this it is possible to detect not only the rotational speed of the drive shaft of the electric motor, but particularly the direction of rotation, and a corresponding motor control can be performed. This specific embodiment and the preferred placement of the position sensor on the back of the electric motor also result in practically no enlargement of the housing cover.

Further advantages, details and characteristics of the invention ensue in what follows from the exemplary embodiment shown by mean/of the drawings.

BRIEF DESCRIPTION OF THE DRAWINGS

FIG. 2 a detailed sectional view in respect to the rear support of the electric motor in the housing;

FIG. 3 a wiring diagram in respect to short-circuiting the electric motor; and

FIG. 4 a schematic perspective detailed view of a position sensor.

DESCRIPTION OF PREFERRED EMBODIMENT

Figure 1:
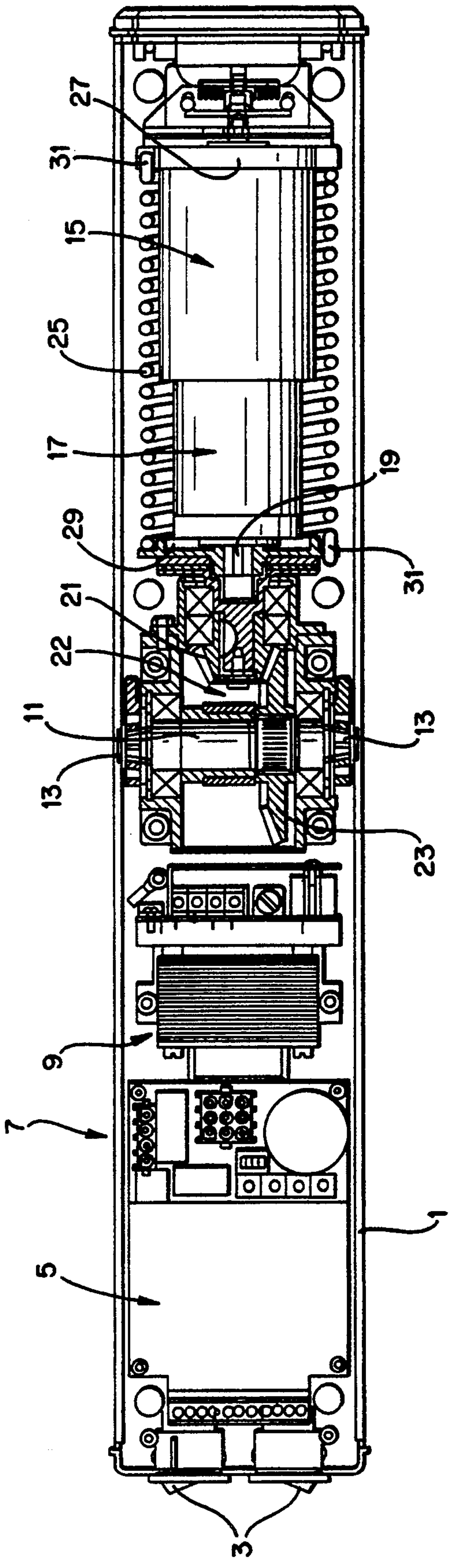
FIG. 1 a schematic longitudinal sectional view parallel to the drive shaft.

The electro-magnetic pivot wing drive is shown in the drawing figures, and includes a housing 1 comprising a removable housing cover and a housing bottom, two lateral switches 3 for placing the arrangement into operation, a control and electronics 5, housed in the interior, for example with further switch units 7, and a power supply 9. The above components are all disposed in relation to a drive shaft 11 located approximately in the center of the housing 1, which lies crosswise to the longitudinal axis of the housing and which has a an upper and lower free connecting end 13, by means of which a linkage of bars for opening and closing the door can be connected. When opening a left or right wing, the arrangement can be turned symmetrically 180° in such a way that, with a direction of rotation drive which otherwise is the same, the free connecting end 13, which in the drawings is on top as well as on the bottom, respectively points downward for fastening the above mentioned linkage of bars for opening and closing, for example of a pivoting door.

In the exemplary embodiment of FIG. 1, the electric motor 15 is provided on the right and, on the same center shaft, a gear drive 11, preferably a planetary gear 17, is connected to the front. The intermediate shaft 19 extending from the planetary gear 17 is connected with a first bevel wheel 21, which engages a further bevel wheel 23 seated on the power take-off shaft 11.

By means of the gear 17, employed, as well as different sizes of the bevel wheels 21 and 23 of the bevel wheel gear 22, it is possible to obtain various transmission ratios of the motor shaft, not shown in detail, to the power take-off shaft of, for example 1:50 to 1:150, in particular in the range of 1:70 to 1:120, preferably in a range of 1:80 to 1:100, i.e. around 1:90.

In the exemplary embodiment illustrated, a helical spring 25 of an appropriate spring diameter and length and a correspondingly large number of coils has been placed on a common central axis around the electric motor 15 and the connected planetary gear 17. At its rear portion, to the right in FIG. 1, the helical spring 25 is supported on a support disk 27 fixedly supported on the housing, and on its forward end on a striker disk 29. For this purpose, the ends of the helical spring 25 are provided with a suspension recess 31, which can be suspended from corresponding anchor places on the support disk 27 or the striker disk 29.

As shown in FIG. 2, the motor/gear unit 15, 17 is supported and held on its back on the housing bottom via an L-shaped support 33, for example. This is followed on the power take-off side by the said support disk 27, which is or can be provided with a central bore for receiving the electric motor housing 15'.

For example, the support disk 27 can be held by means of a plurality of screws located offset in the circumferential direction of the central axis of the electric motor and fastened on the parallel wall of the L-shaped support 33. After removal of the screws it is possible, for example, to turn the support disk 27 in its circumferential direction and in this way the helical spring can be pre-stressed in accordance with the desired characteristic. Following this, the screws located in the axial direction and not shown in the drawings are replaced.

As shown schematically in FIG. 3, a switch or relay 37 or any other suitable breaker means is additionally provided. In this case the electric motor 15 is short-circuited, when not powered. That is, relay 37 serves to prevent the motor 15 in the event of a power failure from acting as a generator when the door is manually opened and hence the door is opened only against the force of the spring. When, however, the door is closed by the force of the spring and during a power failure, switch 37 enables the motor to operate as a generator, hence damping the final closing movement of the door. Referring to FIG. 3, when power is again provided, the switch 37 is repositioned such that the motor is automatically driven by the CPU.

In the exemplary embodiment a position sensor 41 is provided on the side of the electric motor 15 opposite the planetary gear 17 and on a projecting shaft stub 39. For this purpose it consists of a positioning disk 43 which is provided with a slitted annular edge 45 with slits 47. As can be seen in the enlarged schematic detailed view of FIG. 4, two photoelectric barriers 49 are preferably arranged in such a way that the light beam falls on the annular edge 45 which turns along with the shaft of the electric motor. When a respectively one of the slits 47, disposed at even distances from each other in the annular edge 45, reaches the area of the light beam, the latter is permitted to fall through and can be received by the light detector, for example, a photodiode, integrated into the area of the photoelectric barrier 49. It is possible to evaluate the signals in a digital manner by means of an appropriate CPU in such a way, that it is always possible to detect an exact displacement position of the electric motor and in this way the exact position of a pivot wing in the end, despite the total gear ratio. Due to the fact that two photoelectric barriers 49 are disposed side-by-side, it is possible not only to detect the exact position of the pivot wing, but especially the direction of rotation and to process it in the electric control unit CPU (FIG. 3).

The opportunity is provided by this to perform any arbitrary door opening and door closing process by using an appropriate, preferably digital, electronic device. This is done in accordance with a pre-settable opening and closing speed with correspondingly selectively opening and closing moments, wherein the curve can be preset as desired. It is always possible to provide a directed control from the specific position by means of the position sensor 41. It is possible to employ a so-called 4-quadrant end stage with this arrangement, which therefore means that the angular velocity as well as the turning moment is controllable as desired during opening as well as closing of the pivot wing.

The position sensors 41 shown in FIG. 4 have been omitted in the illustration in accordance with FIGS. 1 and 2 for the sake of clarity.

When the arrangement breaks down, the mode of operation is such that the electric motor 15 is always short-circuited via the switch or relay 37 mentioned and acts as a generator. In addition, the pre-stressing force of the helical spring 25 acts on the power take-off shaft 11, which is selected to be such that the force for opening the door does not exceed 80N, preferably 70N or even 60N, as a rule. After release of the door, the closing operation is initiated via the appropriately large-sized helical spring, in the course of which the short-circuited electric motor acts as a generator and in this way clearly damps the door closing process so that the door closes in a manner similar to that which is achieved by a hydraulic door closing device.

In this case the spring moment of the helical spring 15 should preferably be selected in such a way that the increase of the spring moment during door opening in no case is 100%, preferably is less than 80%, 75%, 60% or maximally 50%. Finally, the helical spring 15 can also be of such size that the increase of the spring moment lies below 40% or even 30%, for example. A particularly advantageous spring moment with an optimal space utilization results if the material cross-section of the helical spring is selected to be rectangular, i.e. at least generally in the form of a polygon.

In the exemplary embodiment shown, the material cross-section has a diameter up to the length of the edge between preferably 5 mm to 10 mm, in particular 6 mm to 8 mm, preferably around 7 mm.

We claim:

1. An electro-mechanical rotary leaf drive for pivotal leaves for doors comprising:

an elongated housing, an electric motor and a transmission adjoining said electric motor as an axial extension thereof and in said housing, said transmission having an intermediate output shaft drivingly connected with a bevel transmission, said bevel transmission having an output drive shaft arranged transversely of said elongated housing and adapted for coupling with a linkage for driving a pivotal leaf, a restoring spring unit acting on the output drive shaft, said restoring spring unit comprising a helical spring having at least thirty turns and a spring moment during an opening movement of the rotary leaf which increases less than 100% as a maximum, said helical spring surrounding one of said electric motor and said transmission and at a drive output end thereof bearing against an entrainment means, said entrainment means being connected in such manner as to prevent relative rotation with said intermediate shaft, and means for deenergizing said electric motor during the entire closing phase of the pivotal leaf to obtain a generator effect and consequent damping during the door closing phase.

2. The rotary leaf drive according to claim 1 wherein said helical spring has an axis arranged in parallel axial alignment with respect to a central axis of the electric motor.

3. The rotary leaf drive according to claim 2 wherein said entrainment means comprises an entrainment disk mounted on said intermediate shaft.

4. The rotary leaf drive according to claim 1 including a support disk for supporting said helical spring, said support disk being supported and located within said housing and on a side of said electric motor remote from said output drive shaft.

5. The rotary leaf drive according to claim 1 wherein the magnitude of the bias of said spring is variable and means including said support disk for selecting a magnitude of the bias to be applied to said spring.

6. The rotary leaf drive according to claim 1 wherein in an opening movement of the rotary leaf, the spring moment of the helical spring increases by less than 80% as a maximum.

7. The rotary leaf drive according to claim 1 wherein in an opening movement of the rotary leaf, the spring moment of the helical spring increases by less than 60% as a maximum.

8. The rotary leaf drive according to claim 1 wherein said helical spring has at least 40 turns.

9. The rotary leaf drive according to claim 1 wherein said helical spring has at least 50–60 turns.

10. The rotary leaf drive according to claim 1 wherein the helical spring possesses 100 turns as a maximum.

11. The rotary leaf drive according to claim 1 wherein the diameter of the helical spring is between 7–11 cm.

12. The rotary leaf drive according to claim 1 including a position sensor for detecting one of an opening and closed position of the rotary leaf.

13. The rotary leaf drive according to claim 12 wherein said position sensor is coupled with said intermediate shaft.

14. The rotary leaf drive according to claim 12 wherein the position sensor is provided on the side of the electric motor opposite said output drive shaft and on a stub shaft carried by said electric motor.

15. The rotary leaf drive according to claim 12 wherein the position sensor comprises a disk having markings and stationary detectors for reading said markings.

16. The rotary leaf drive according to claim 15 wherein at least one detector comprises a photoelectric detector.

17. The rotary leaf drive according to claim 15 wherein said markings on said disk comprise slots formed on a peripheral surface thereof extending in generally parallel relation to the axial direction of said motor.

18. The rotary leaf drive according to claim 15 wherein two detectors of said stationary detectors comprise photoelectric detectors for sensing the direction of rotation.

19. The rotary leaf drive according to claim 18 including a 4 quadrant control means for controlling the movement of the pivotal leaf and including means for preselecting a speed of rotation and torque in the opening and closing directions.

* * * * *